US010053151B2

(12) United States Patent
Murata et al.

(10) Patent No.: US 10,053,151 B2
(45) Date of Patent: Aug. 21, 2018

(54) REINFORCING STRUCTURE OF VEHICLE FRAME MEMBER

(71) Applicant: TOYOTA JIDOSHA KABUSHIKI KAISHA, Toyota-shi (JP)

(72) Inventors: Soshiro Murata, Toyota (JP); Takashi Sasaki, Miyoshi (JP); Hideaki Kanasugi, Nisshin (JP); Kazuki Shimizu, Kariya (JP); Minako Izumi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 72 days.

(21) Appl. No.: 15/371,664

(22) Filed: Dec. 7, 2016

(65) Prior Publication Data

US 2017/0183036 A1 Jun. 29, 2017

(30) Foreign Application Priority Data

Dec. 25, 2015 (JP) .................................. 2015-254214

(51) Int. Cl.
*B60N 99/00* (2006.01)
*B62D 21/11* (2006.01)
(Continued)

(52) U.S. Cl.
CPC ............ *B62D 21/11* (2013.01); *B62D 29/008* (2013.01); *B62D 29/041* (2013.01);
(Continued)

(58) Field of Classification Search
CPC .... B62D 21/11; B62D 29/008; B62D 29/041; B60Y 2304/03; B60Y 2410/121; B60Y 2410/122; B60Y 2410/124
See application file for complete search history.

(56) References Cited

U.S. PATENT DOCUMENTS 2,113,540 A * 4/1938 Maddock ............... B62D 21/06
280/794
2,257,664 A * 9/1941 Almdale ............... B62D 21/06
280/794
(Continued)

FOREIGN PATENT DOCUMENTS

JP 1-158225 U 11/1989
JP 2002-513715 5/2002
(Continued)

OTHER PUBLICATIONS

Japanese Office Action dated Jan. 30, 2018 in Japanese Patent Application No. 2015-254214 (with English translation), citing documents AO and AP therein, 5 pages.

*Primary Examiner* — Lori L Lyjak
(74) *Attorney, Agent, or Firm* — Oblon, McClelland, Maier & Neustadt, L.L.P.

(57) ABSTRACT

A reinforcing structure of a vehicle frame member includes: ribs that integrally connect standing wall portions, that are formed at a planar portion of a vehicle frame member, to one another, and that reinforce the planar portion; portions of gradually changing thickness that are formed at connected portions of the ribs with the standing wall portions; portions of gradually changing height that are formed at the connected portions of the ribs with the standing wall portions; first curved portions that are formed at the portions of gradually changing thickness; second curved portions that are formed at the portions of gradually changing thickness; third curved portions that are formed at the portions of gradually changing height; and fourth curved portions that are formed at the portions of gradually changing height.

10 Claims, 8 Drawing Sheets

(51) Int. Cl.
*B62D 29/00* (2006.01)
*B62D 29/04* (2006.01)

(52) U.S. Cl.
CPC ..... *B60Y 2304/03* (2013.01); *B60Y 2410/121* (2013.01); *B60Y 2410/122* (2013.01); *B60Y 2410/124* (2013.01)

(56) References Cited

U.S. PATENT DOCUMENTS

| | | | | |
|---|---|---|---|---|
| 2,841,415 | A * | 7/1958 | Black | B62D 25/2054 280/149.2 |
| 4,810,028 | A * | 3/1989 | Henricks | B62D 21/08 293/42 |
| 5,482,321 | A * | 1/1996 | Soeffge | B62D 21/11 280/781 |
| 5,593,001 | A * | 1/1997 | Takano | F16F 1/44 180/312 |
| 6,332,756 | B1 * | 12/2001 | Yanagisawa | B63H 1/32 416/198 R |
| 2002/0160130 | A1 * | 10/2002 | Sheldon | B62D 21/15 428/34.1 |
| 2004/0256888 | A1 * | 12/2004 | Le Gall | B62D 29/002 296/187.02 |
| 2007/0257519 | A1 * | 11/2007 | Hanson, Jr. | B62D 21/157 296/204 |
| 2010/0173125 | A1 * | 7/2010 | Malek | B29C 45/14 428/138 |
| 2015/0166104 | A1 | 6/2015 | Ohhama et al. | |
| 2016/0236715 | A1 * | 8/2016 | Kurokawa | B62D 25/2045 |

FOREIGN PATENT DOCUMENTS

| | | |
|---|---|---|
| JP | 2004-249807 | 9/2004 |
| JP | 2012-81882 | 4/2012 |
| WO | WO 2014/017260 A1 | 1/2014 |

* cited by examiner

REINFORCING STRUCTURE OF VEHICLE FRAME MEMBER

CROSS-REFERENCE TO RELATED APPLICATION

This application is based on and claims priority under 35 USC 119 from Japanese Patent Application No. 2015-254214 filed on Dec. 25, 2015, the disclosure of which is incorporated by reference herein.

BACKGROUND

Technical Field

The present disclosure relates to a reinforcing structure of a vehicle frame member.

Related Art

There are conventionally known structures in which reinforcing ribs are provided at a suspension member that is made of an aluminum alloy, and curved portions are provided at the roots of these ribs (see, for example, Japanese Patent Application Laid-Open (JP-A) No. 2012-81882 (Patent Document 1)).

However, in a structure in which reinforcing ribs are provided at a vehicle frame member that is molded from a resin material or a light metal material such as an aluminum alloy or the like, there is still room for improvement with regard to structures that efficiently improve the reinforcing effect of the ribs on the vehicle frame member while reducing the weight of the ribs.

SUMMARY

An object of the present disclosure is to provide a reinforcing structure of a vehicle frame member that efficiently improves the reinforcing effect of ribs on a vehicle frame member, while reducing the weight of the ribs.

In order to achieve the above-described object, a reinforcing structure of a vehicle frame member relating to a first aspect of the present disclosure includes: a vehicle frame member that is molded from a light metal material or a resin material, and at which at least one of plural standing wall portions and plural projecting portions are formed at a planar portion; ribs that are formed at the planar portion, and that integrally connect the standing wall portions to one another or the projecting portions to one another or the standing wall portions and the projecting portions, and that reinforce the planar portion; portions of gradually changing thickness that are formed at connected portions of the ribs with the standing wall portions or the projecting portions, and at which a thickness of the rib is made to become thicker toward the standing wall portion or the projecting portion; portions of gradually changing height that are formed at the connected portions of the ribs with the standing wall portions or the projecting portions, and at which a height of the rib is made to become higher toward the standing wall portion or the projecting portion; first curved portions that are formed at the portions of gradually changing thickness; second curved portions that are formed in continuation with the first curved portions at the portions of gradually changing thickness, at further toward the standing wall portion sides or the projecting portion sides than the first curved portions, and whose curvature is greater than that of the first curved portions; third curved portions that are formed at the portions of gradually changing height; and fourth curved portions that are formed in continuation with the third curved portions at the portions of gradually changing height, at further toward the standing wall portion sides or the projecting portion sides than the third curved portions, and whose curvature is greater than that of the third curved portions.

In accordance with the first aspect, the first curved portions are formed at the portions of gradually changing thickness, and the second curved portions, whose curvature is greater than that of the first curved portions, are formed at the portions of gradually changing thickness in continuation with the first curved portions and further toward the standing wall portion sides or the projecting portion sides than the first curved portions. Further, the third curved portions are formed at the portions of gradually changing height, and the fourth curved portions, whose curvature is greater than that of the third curved portions, are formed at the portions of gradually changing height in continuation with the third curved portions and further toward the standing wall portion sides or the projecting portion sides than the third curved portions.

Accordingly, as compared with a structure in which curved portions of a uniform curvature (only the first curved portions) are formed at the portions of gradually changing thickness and curved portions of a uniform curvature (only the third curved portions) are formed at the portions of gradually changing height, excess thickness of the ribs is reduced by the second curved portions and the fourth curved portions, and, when load is inputted to the vehicle frame member, concentrations of stress with respect to the portions of gradually changing thickness are mitigated by the first curved portions, and concentrations of stress with respect to the portions of gradually changing height are mitigated by the third curved portions. Namely, in accordance with the present disclosure, while the weight of the ribs is reduced, the effect of reinforcing the vehicle frame member by these ribs is improved efficiently.

Further, a reinforcing structure of a vehicle frame member relating to a second aspect of the present disclosure includes: a vehicle frame member that is molded from a light metal material or a resin material, and at which at least one of plural standing wall portions and plural projecting portions are formed at a planar portion; ribs that are formed at the planar portion, and that integrally connect the standing wall portions to one another or the projecting portions to one another or the standing wall portions and the projecting portions, and that reinforce the planar portion; portions of gradually changing thickness that are formed at connected portions of the ribs with the standing wall portions or the projecting portions, and at which a thickness of the rib is made to become thicker toward the standing wall portion or the projecting portion; portions of gradually changing height that are formed at the connected portions of the ribs with the standing wall portions or the projecting portions, and at which a height of the rib is made to become higher toward the standing wall portion or the projecting portion; first linear portions that are formed at the portions of gradually changing thickness; thickness direction curved portions that are formed in continuation with the first linear portions at the portions of gradually changing thickness, at further toward the standing wall portion sides or the projecting portion sides than the first linear portions; second linear portions that are formed at the portions of gradually changing height; and height direction curved portions that are formed in continuation with the second linear portions at the portions of gradually changing height, at further toward the standing wall portion sides or the projecting portion sides than the second linear portions.

In accordance with the second aspect, the first linear portions are formed at the portions of gradually changing thickness, and the thickness direction curved portions are formed at the portions of gradually changing thickness in continuation with the first linear portions and further toward the standing wall portion sides or the projecting portion sides than the first linear portions. Further, the second linear portions are formed at the portions of gradually changing height, and the height direction curved portions are formed at the portions of gradually changing height in continuation with the second linear portions and further toward the standing wall portion sides or the projecting portion sides than the second linear portions.

Accordingly, as compared with a structure in which only the first linear portions are formed at the portions of gradually changing thickness and only the second linear portions are formed at the portions of gradually changing height, excess thickness of the ribs is reduced by the thickness direction curved portions and the height direction curved portions, and, when load is inputted to the vehicle frame member, concentrations of stress with respect to the portions of gradually changing thickness are mitigated by the first linear portions, and concentrations of stress with respect to the portions of gradually changing height are mitigated by the second linear portions. Namely, in accordance with the present disclosure, while the weight of the ribs is reduced, the effect of reinforcing the vehicle frame member by these ribs is improved efficiently.

In a reinforcing structure of a vehicle frame member relating to a third aspect, in the reinforcing structure of a vehicle frame member relating to the first or second aspect, a length of the portion of gradually changing thickness and a length of the portion of gradually changing height in an extending direction of the rib are made to be the same.

In accordance with the third aspect, the length of the portion of gradually changing thickness and the length of the portion of gradually changing height in the extending direction of the rib are made to be the same. Accordingly, as compared with a structure in which the length of the portion of gradually changing thickness and the length of the portion of gradually changing height in the extending direction of the rib are not made to be the same, the load resistance of the vehicle frame member due to the ribs is improved regardless of the direction of input of load to the vehicle frame member. Note that "the same" in the present disclosure also includes substantially the same.

In a reinforcing structure of a vehicle frame member relating to a fourth aspect, in the reinforcing structure of a vehicle frame member relating to any one of the first through third aspects, a length of the portion of gradually changing thickness and a length of the portion of gradually changing height in an extending direction of the rib are respectively made to be greater than or equal to a height of the standing wall portions or the projecting portions.

In accordance with the fourth aspect, the length of the portion of gradually changing thickness and the length of the portion of gradually changing height in the extending direction of the rib are respectively made to be greater than or equal to the height of the standing wall portions or the projecting portions. Accordingly, as compared with a structure in which the length of the portion of gradually changing thickness and the length of the portion of gradually changing height in the extending direction of the rib are respectively made to be less than the height of the standing wall portions or the projecting portions, the reinforcing effect with respect to the standing wall portions or the projecting portions is improved efficiently.

In a reinforcing structure of a vehicle frame member relating to a fifth aspect, in the reinforcing structure of a vehicle frame member relating to any one of the first through fourth aspects, the ribs have thin plate ribs and thick plate ribs whose thicknesses at a portion other than the portion of gradually changing thickness differ from one another, and a length of the portion of gradually changing thickness at the thin plate rib is made to be longer than a length of the portion of gradually changing thickness at the thick plate rib.

In accordance with the fifth aspect, the length of the portion of gradually changing thickness at the thin plate rib is made to be longer than the length of the portion of gradually changing thickness at the thick plate rib. Accordingly, as compared with structures in which the length of the portion of gradually changing thickness at the thin plate rib is made to be the same as, or is made to be shorter than, the length of the portion of gradually changing thickness at the thick plate rib, the strength and rigidity of the portions of gradually changing thickness at the thin plate ribs are improved while the weight of the ribs is reduced (a lightening of the weight of the vehicle frame member is devised).

In a reinforcing structure of a vehicle frame member relating to a sixth aspect, in the reinforcing structure of a vehicle frame member relating to any one of the first through fifth aspects, the vehicle frame member is a suspension member, and the standing wall portions are peripheral walls of the suspension member, and the projecting portions are bosses for fastening of the suspension member.

In accordance with the sixth aspect, the vehicle frame member is a suspension member, and the standing wall portions are peripheral walls of the suspension member, and the projecting portions are bosses for fastening of the suspension member. Accordingly, the strength and rigidity of the suspension member are improved, and warping that arises at the suspension member is suppressed.

In accordance with the first and second aspects, the effect of reinforcing the vehicle frame member by the ribs can be improved efficiently, while the weight of the ribs is reduced.

In accordance with the third aspect, the load resistance of the vehicle frame member due to the ribs can be improved regardless of the direction of input of load to the vehicle frame member.

In accordance with the fourth aspect, the reinforcing effect with respect to the standing wall portions or the projecting portions can be improved efficiently.

In accordance with the fifth aspect, the strength and rigidity of the portions of gradually changing thickness at the thin plate ribs can be improved while the weight of the ribs is reduced.

In accordance with the sixth aspect, the strength and rigidity of the suspension member can be improved, and warping that arises at the suspension member can be suppressed.

DETAILED DESCRIPTION

Embodiments relating to the present disclosure are described in detail hereinafter on the basis of the drawings. Note that, for convenience of explanation, a suspension member 12 (in detail, a rear cross member main body 24 of a rear cross member 20) is used as an example of a vehicle frame member relating to the present embodiment. Accordingly, arrow DO that is shown appropriately in the respective drawings indicates the vehicle body downward direction, arrow FR indicates the vehicle body forward direction, and arrow LH indicates the vehicle body leftward direction. Further, in the following explanation, when vertical, longitudinal and left-right directions are used without being specified, they mean the vertical of the vehicle body vertical direction, the longitudinal of the vehicle body longitudinal direction, and the left and right of the vehicle body left-right direction (the vehicle transverse direction).

First Embodiment

Figure 1:
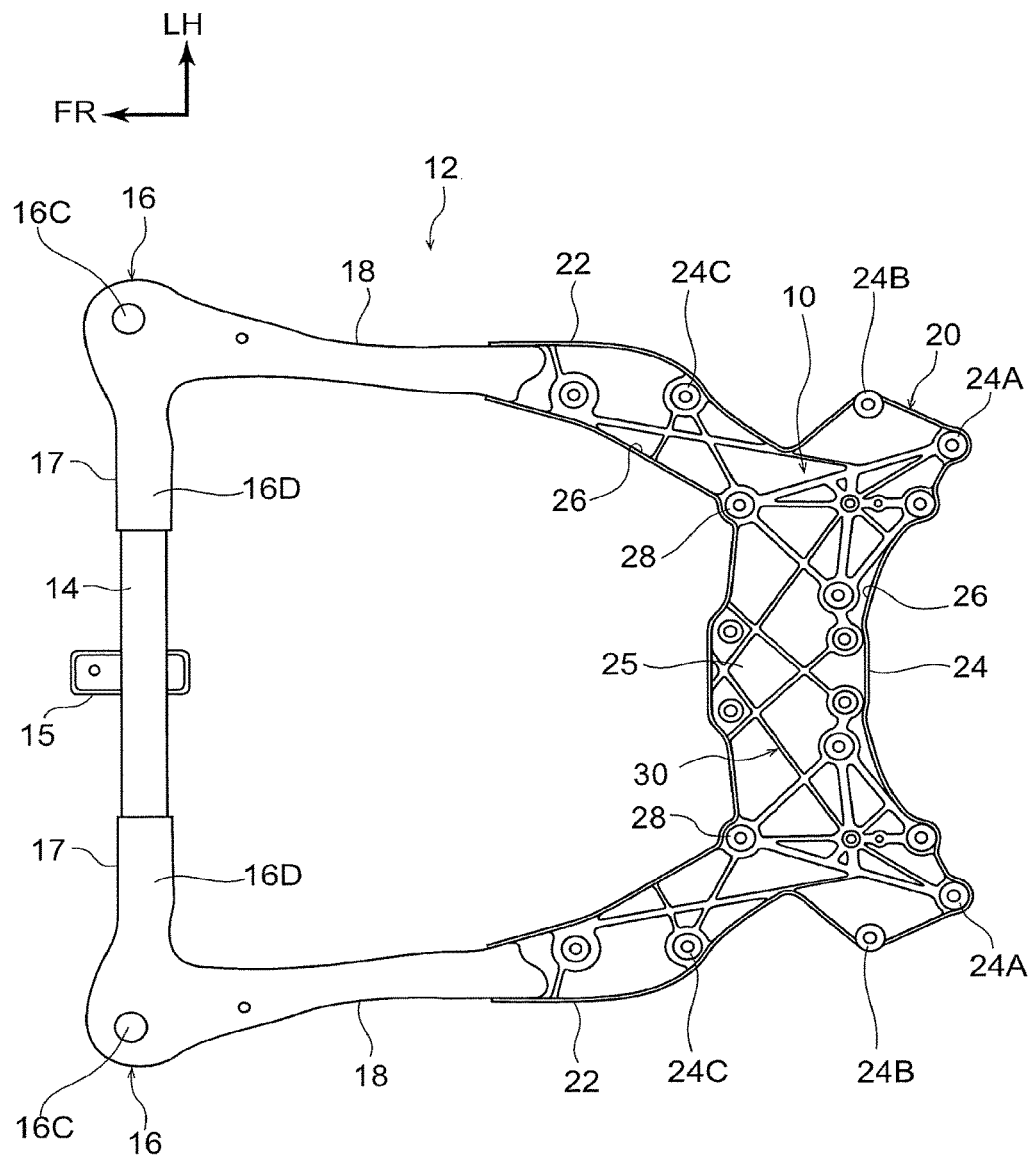
FIG. 1 is a bottom view showing a suspension member that serves as a vehicle frame member that has a reinforcing structure relating to a first embodiment.

First, a reinforcing structure 10 relating to a first embodiment is described. The suspension member 12 shown in FIG. 1 is supported at the lower sides of the front portions of a pair of left and right front side members (not illustrated) that extend along the vehicle body longitudinal direction, in a state in which the suspension member 12 hangs-down from these front side members. Here, the respective front side members have kick portions for causing the vehicle body front portion sides to be positioned higher than the vehicle body rear portion sides.

Accordingly, a pair of left and right front body mounts 16, that are described later and that are the front end portions of the suspension member 12, are mounted to the front end portions of the front side members further toward the vehicle body front side than the kick portions. A pair of left and right bosses 24A for side member mounting of the rear cross member 20, that is described later and that is the rear end portion of the suspension member 12, are mounted to the lower end portions of the kick portions.

The suspension member 12 has: a front cross member 14 that extends in the vehicle transverse direction; the rear cross member 20 that has the rear cross member main body 24 extending in the vehicle transverse direction and a pair of left and right sub side rail portions 22 extending integrally toward the vehicle body front and outer sides respectively from the vehicle transverse direction both end portions of the rear cross member main body 24; and the pair of left and right front body mounts 16 that connect the vehicle transverse direction both end portions of the front cross member 14 and the vehicle body front side end portions of the sub side rail portions 22.

The front cross member 14 is formed in the shape of a uniform, rectangular, closed cross-section as seen in a cross-section orthogonal to the vehicle transverse direction (the extending direction), by the extrusion molding of a light metal material such as an aluminum alloy or the like. Note that a power unit (not shown) that includes an engine and a transmission is disposed at the vehicle body upper side of the suspension member 12. Accordingly, an engine mount 15 for supporting the power unit from the lower side is provided at the substantially central portion in the vehicle transverse direction at the front cross member 14.

The rear cross member 20 is formed in the shape of an open cross-section whose vehicle body lower side is open, by die-casting of a light metal material such as an aluminum alloy or the like. The pair of left and right sub side rail portions 22 are formed, in cross-section, substantially in the shapes of hats whose vehicle body lower sides are open. Further, the bosses 24A for side member mounting, that are for mounting to the lower end portions of the kick portions of the respective front side members, are formed at the vehicle transverse direction both end portions of the rear cross member main body 24.

Further, bosses 24B, 24C for lower arm mounting, that are for mounting lower arms (not illustrated) that structure suspension arms (not illustrated) respectively, are formed at the vehicle transverse direction both end portions of the rear cross member main body 24, further toward the vehicle body front side than the respective bosses 24A for side member mounting. Note that the structure of the rear cross member main body 24, that has the bosses 24A for side member mounting and the bosses 24B, 24C for lower arm mounting, is described in detail later.

The front body mount 16 is formed in a substantial "L" shape as seen in plan view by press molding of a light metal material such as an aluminum alloy or the like, and is structured by an upper mount (not illustrated) that has an open cross-sectional shape and whose vehicle body lower side is open, and a lower mount 16D that has an open cross-sectional shape and whose vehicle body upper side is open. Respective corner portions 16C of the pair of left and right front body mounts 16 are structures that are supported at the front end portions of the respective front side members.

The portion that is further toward the vehicle body rear side than the corner portion 16C of the front body mount 16 is a side rail portion 18 that extends in the vehicle body longitudinal direction. As seen in a side view viewed from the vehicle transverse direction, a (downwardly-convex) curved portion (not illustrated) that is convex toward the vehicle body lower side is formed at the substantially central portion in the extending direction of the side rail portion 18.

Substantially the upper half (the upper mount) of the rear end portion of the side rail portion 18 is joined to the sub side rail portion 22. In detail, the lower end portion of the sub side rail portion 22 is linearly joined by arc welding to the side surfaces of the side rail portion 18 (the upper mount). Due thereto, the substantially lower half (the lower mount 16D) of the rear end portion of the side rail portion 18 is a structure that is not covered by the sub side rail portion 22, and is in a state of being exposed to the exterior.

Further, the portion that is further toward the vehicle transverse direction inner side than the corner portion 16C of the front body mount 16 is an extending portion 17 that extends toward that vehicle transverse direction inner side. The vehicle transverse direction inner side end portions of the extending portions 17 are covered on the vehicle transverse direction both end portions of the front cross member 14, and are linearly joined thereto by arc welding. The suspension member 12 is assembled in this way.

The structure of the rear cross member main body 24 at the rear cross member 20 is described in detail next.

Figure 2:
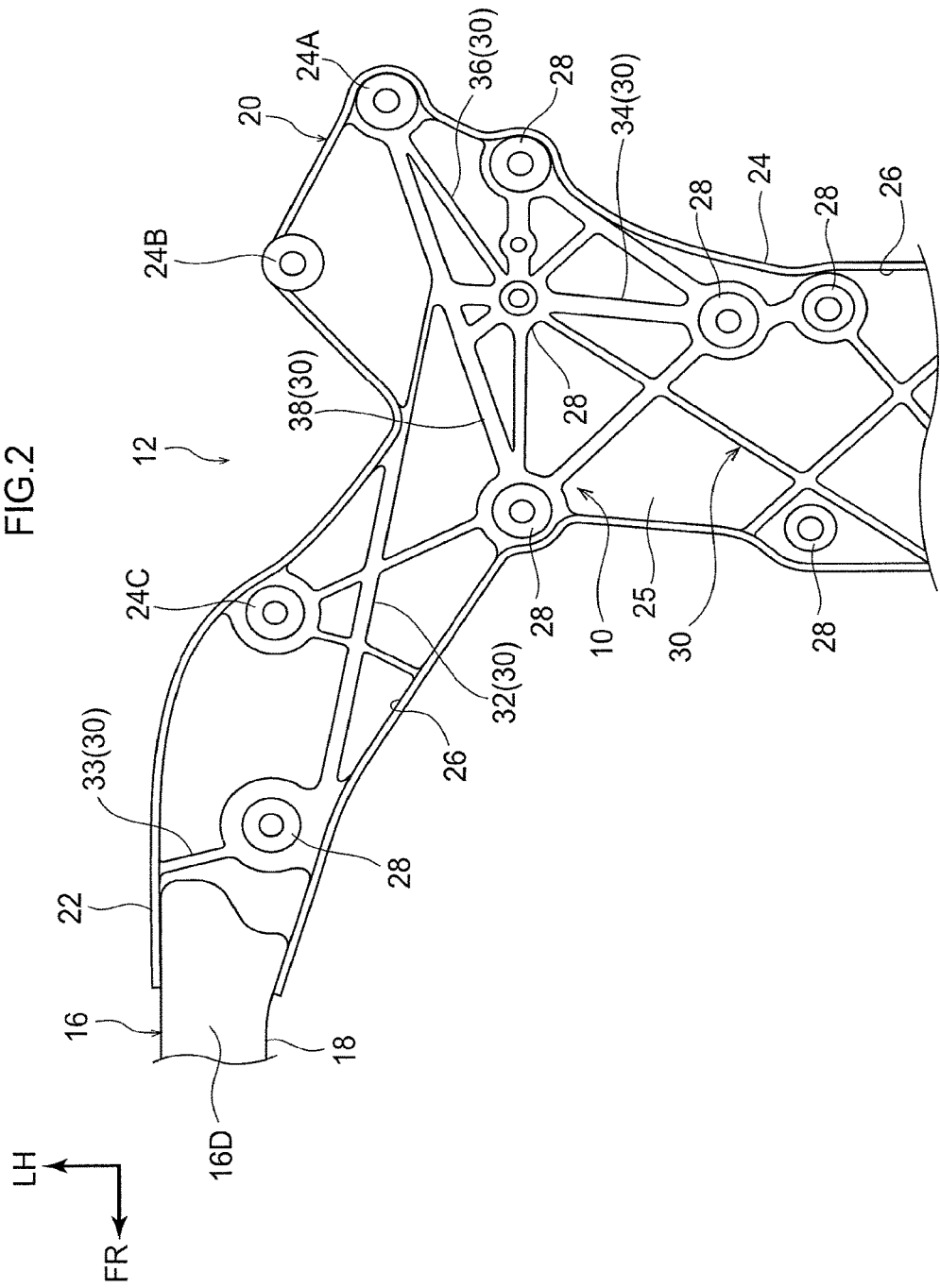
FIG. 2 is a bottom view showing, in an enlarged manner, a portion of a rear cross member of the suspension member that has the reinforcing structure relating to the first embodiment.

As shown in FIG. 1 and FIG. 2, the rear cross member 20 is made to be an open cross-sectional shape. Accordingly, peripheral walls 26, that serve as plural standing wall portions that project-out toward the vehicle body lower side, are formed integrally with the peripheral edge portions of a lower surface 25 that serves as the planar portion of the rear cross member main body 24. Namely, at the peripheral edge portions of the lower surface 25 of the rear cross member main body 24, there are regions where the peripheral walls 26 are not formed (e.g., the regions where the bosses 24B for lower arm mounting that are at the vehicle body rear side are formed), and due thereto, the peripheral walls 26 are divided into plural portions.

Further, bosses 28 for fastening (hereinafter simply called "bosses"), that serve as plural projecting portions that project-out toward the vehicle body lower side, are formed integrally with the lower surface 25 of the rear cross member main body 24. Each of the bosses 28 is formed in the shape of a cylindrical tube, and has a through-hole through which a bolt or the like can be inserted.

Note that the bosses 24A for side member mounting and the bosses 24C for lower arm mounting that are at the vehicle body front side also are examples of the aforementioned projecting portions. Further, the bosses 24A for side member mounting and the bosses 24B, 24C for lower arm mounting also respectively are formed in the shapes of cylindrical tubes, and have through-holes through which bolts or the like can be inserted.

Further, plural ribs 30, that integrally connect the peripheral walls 26 to one another or integrally connect the bosses 28 to one another or integrally connect the peripheral walls 26 and the bosses 28, and that reinforce the lower surface 25, are formed (are formed to project-out) integrally with the lower surface 25 of the rear cross member main body 24. Note that, as shown in FIG. 2, the respective ribs 30 are basically classified into ribs 32 that integrally connect the peripheral walls 26 to one another, ribs 34 that integrally connect the bosses 28 to one another, and ribs 33 that integrally connect the peripheral walls 26 and the bosses 28.

Further, as will be described later, the respective ribs 30 are classified into thin plate ribs 36 whose plate thicknesses are thin, and thick plate ribs 38 whose plate thicknesses are thick. Accordingly, among the ribs 30, there are the thin plate ribs 36 (the ribs 34) that integrally connect the bosses 28 to one another, and the thick plate ribs 38 (the ribs 34) that integrally connect the bosses 28 to one another, and the like, but, in FIG. 2, either one of the reference numerals is applied to each of the regions that are examples.

Figure 3:
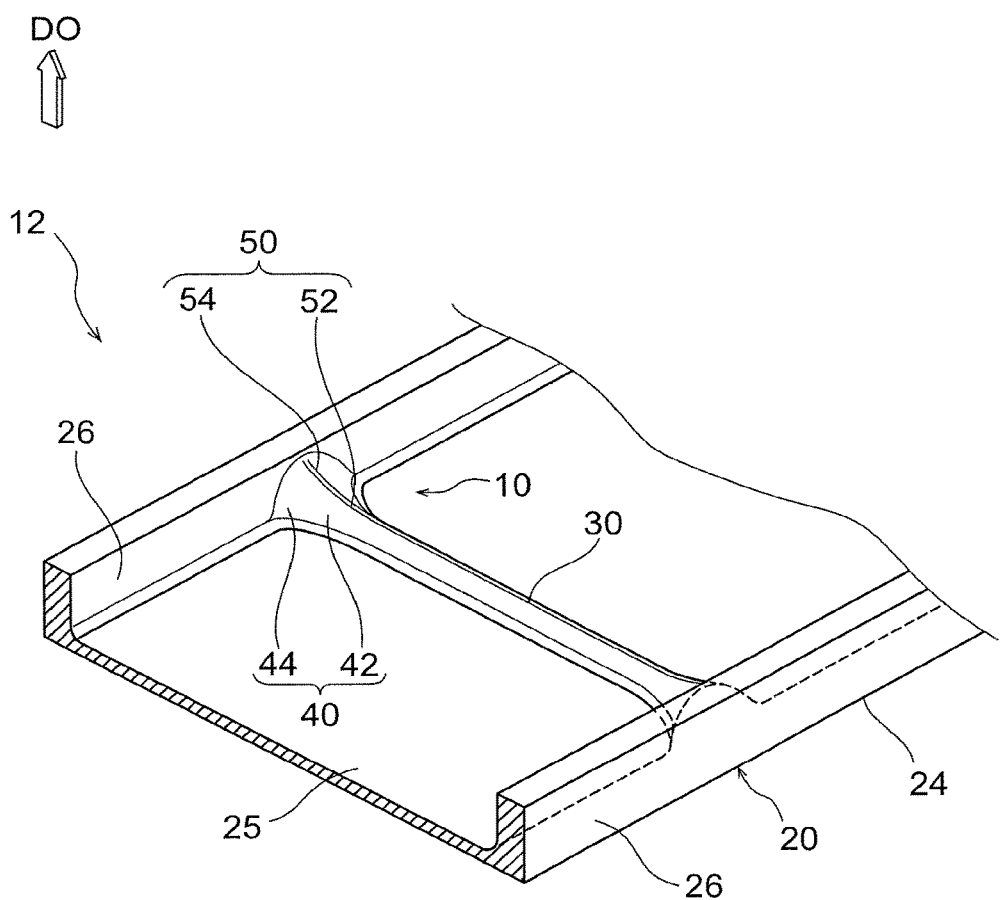
FIG. 3 is a perspective view schematically showing, in an enlarged manner, a portion of a rib that is formed at the rear cross member of the suspension member that has the reinforcing structure relating to the first embodiment.
Figure 4:
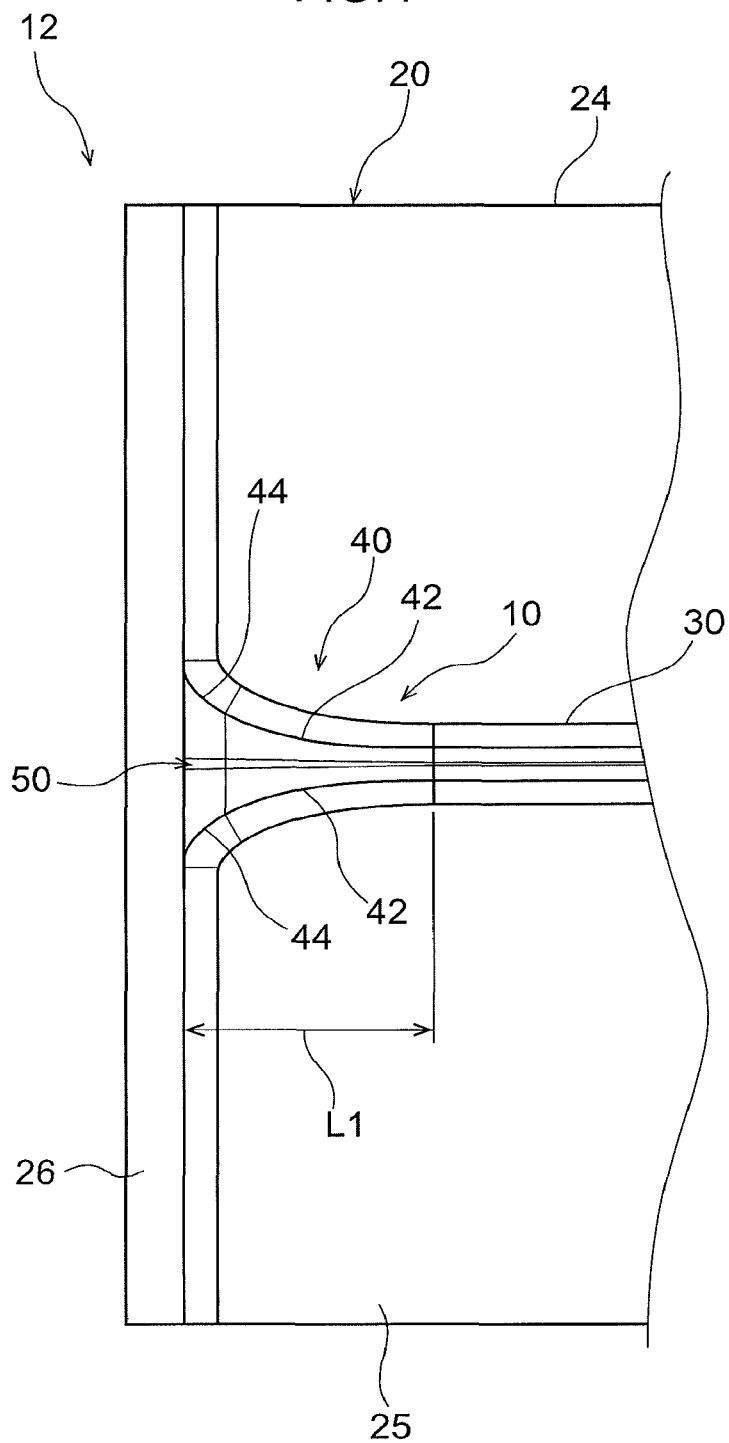
FIG. 4 is a plan view schematically showing, in an enlarged manner, a portion of the rib that is formed at the rear cross member of the suspension member that has the reinforcing structure relating to the first embodiment.
Figure 5:
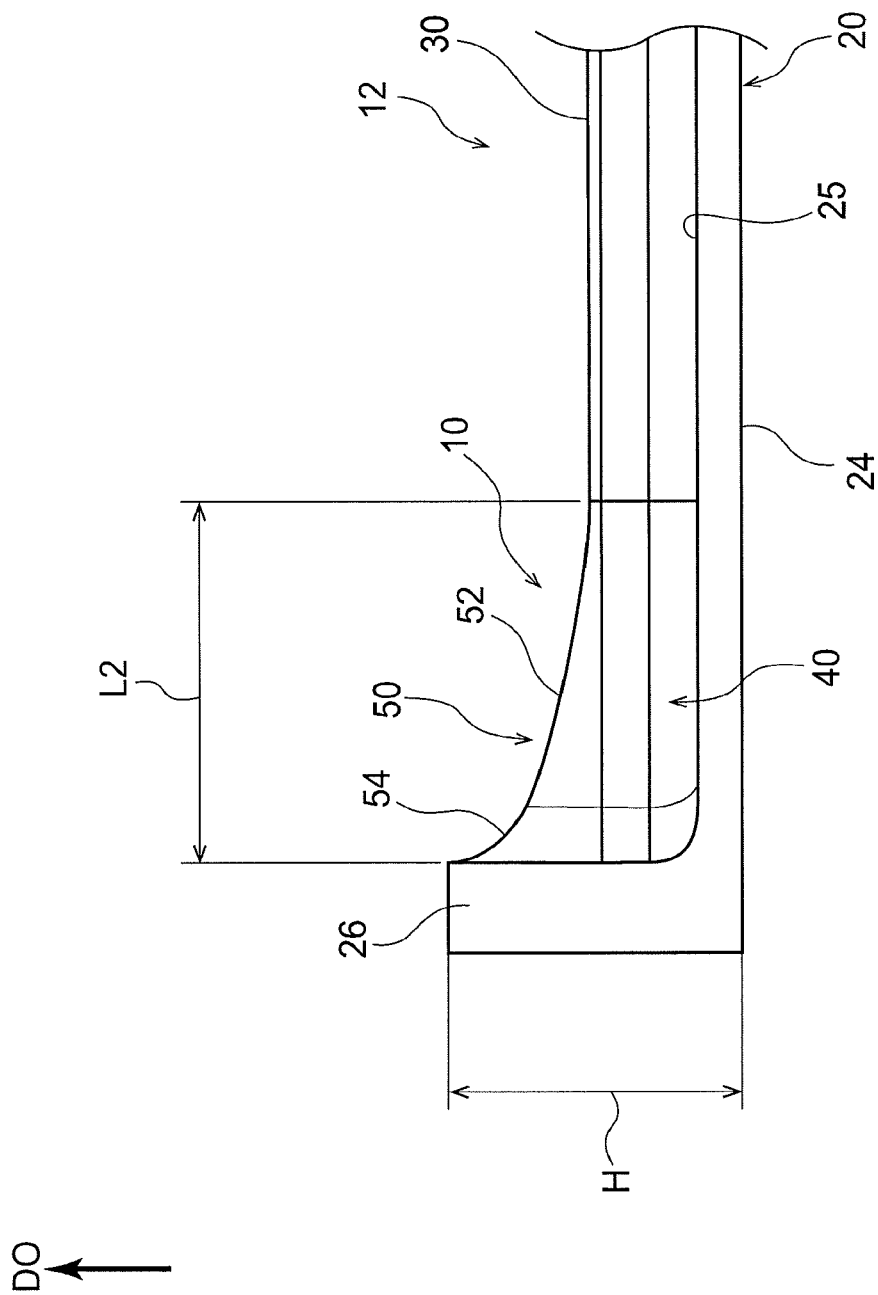
FIG. 5 is a side view schematically showing, in an enlarged manner, a portion of the rib that is formed at the rear cross member of the suspension member that has the reinforcing structure relating to the first embodiment.

Further, as shown in FIG. 3 through FIG. 5, a portion 40 of gradually changing thickness, at which the thickness of the rib 30 is made thicker toward the peripheral wall 26, and a portion of gradually changing height 50, at which the height of the rib 30 is made higher toward the peripheral wall 26, are formed at the connected portion of each of the ribs 30 with the peripheral walls 26. Note that, in FIG. 3 through FIG. 8, examples of the ribs 30 are illustrated schematically, and therefore, the noting of directions other than the vehicle body downward direction is omitted. Further, although FIG. 3 through FIG. 8 illustrate cases of the peripheral wall 26, the same holds for cases of the bosses 28 as well.

As shown in FIG. 4, the portion 40 of gradually changing thickness is formed so as to have linear symmetry with respect to the rib 30 as seen in plan view, and is structured by first curved portions 42 that are at the extending direction central portion side of the rib 30, and second curved portions 44 that are formed continuously with the first curved portions 42 further toward the peripheral wall 26 side than the first curved portions 42 and whose curvature is greater than that of the first curved portions 42.

Further, as shown in FIG. 5, the portion 50 of gradually changing height is structured by a third curved portion 52 that is at the extending direction central portion side of the rib 30, and a fourth curved portion 54 that is formed continuously with the third curved portion 52 further toward the peripheral wall 26 side than the third curved portion 52 and whose curvature is greater than that of third curved portion 52.

Further, as shown in FIG. 4 and FIG. 5, length L1 of the portion 40 of gradually changing thickness and length L2 of the portion 50 of gradually changing height, in the extending direction of the rib 30, are made to be substantially the same (L1≈L2). Further, the length L1 of the portion 40 of gradually changing thickness and the length L2 of the portion 50 of gradually changing height, in the extending direction of the rib 30, are respectively made to be greater than or equal to height H of the peripheral wall 26 (L1≥H, L2≥H).

Figure 6:
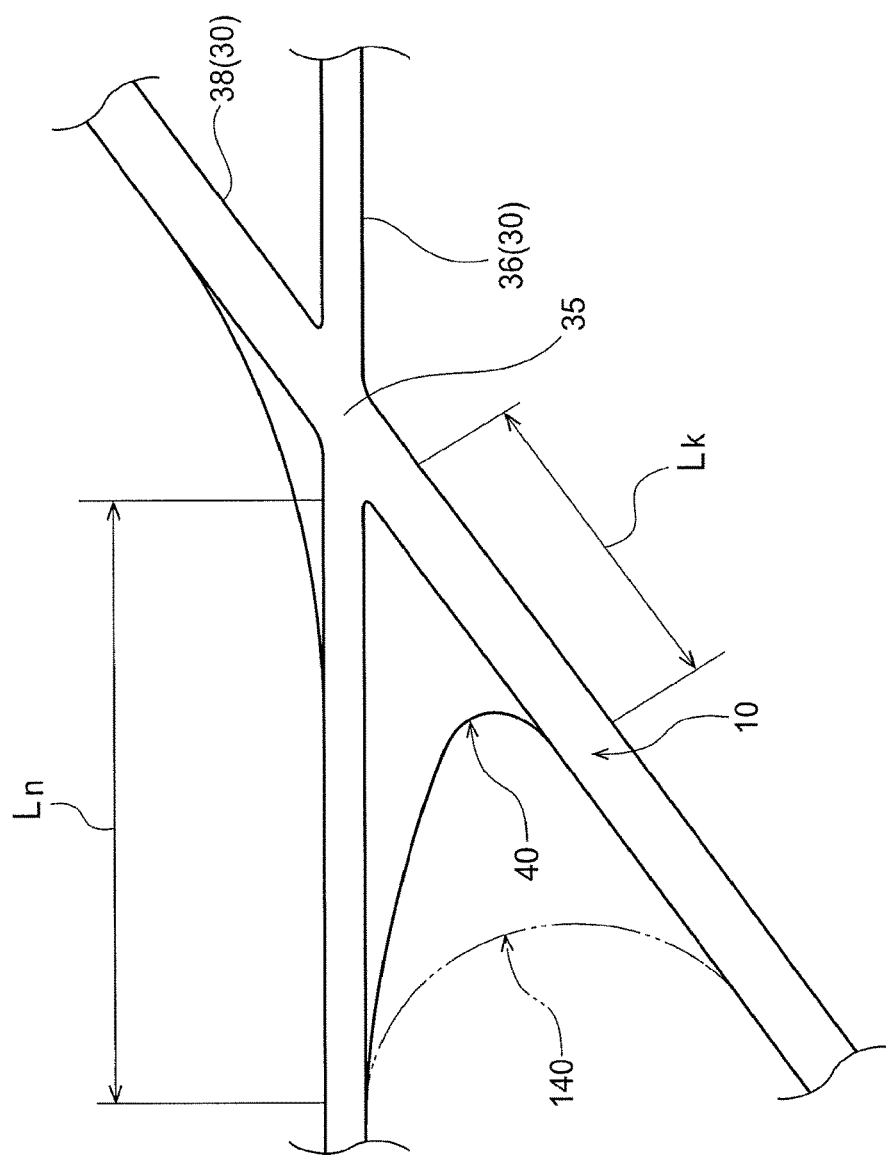
FIG. 6 is a plan view schematically showing, in an enlarged manner, an intersection portion of the ribs that are formed at the rear cross member of the suspension member that has the reinforcing structure relating to the first embodiment.

Further, as shown in FIG. 2 and FIG. 6, the plural ribs 30 that are formed at the lower surface 25 of the rear cross member main body 24 have the plural thin plate ribs 36 and the plural thick plate ribs 38 whose thicknesses of the portions other than the portions 40 of gradually changing thickness differ from one another. Further, as shown in FIG. 6, at an intersection portion 35 where the thin plate rib 36 and the thick plate rib 38 intersect at an acute angle, length Ln of the portion 40 of gradually changing thickness at the thin plate rib 36 is made to be longer than length Lk of the portion 40 of gradually changing thickness at the thick plate rib 38 (Ln>Lk).

Note that, although not illustrated, at the intersection portion 35 where the thin plate rib 36 and the thick plate rib 38 intersect at an acute angle, the length of the portion 50 of gradually changing height at the thin plate rib 36 also is made to be longer than the length of the portion 50 of gradually changing height at the thick plate rib 38. Further, although not illustrated, there are cases in which a similar structure is employed also at intersection portions where the thin plate rib 36 and the thick plate rib 38 intersect at an obtuse angle. Moreover, in FIG. 6, a portion 140 of gradually changing thickness, that relates to a comparative example and has a curved portion of a uniform curvature, is shown by the imaginary line.

Operation of the reinforcing structure 10, that relates to the first embodiment, of the rear cross member 20 (the rear cross member main body 24) at the suspension member 12 that is structured as described above, is described next.

As described above, the plural ribs 30 for reinforcement are formed at the lower surface 25 of the rear cross member main body 24 at the rear cross member 20. Here, at the portions 40 of gradually changing thickness and the portions 50 of gradually changing height at the respective ribs 30, the smaller the curvature of the curved portion, the greater the effect of mitigating stress. However, when a curved portion whose curvature is small and uniform is formed at the portion 40 of gradually changing thickness and at the portion 50 of gradually changing height, the thickness and the height at the peripheral wall 26 (or the boss 28) side are large, and the weight of the rib 30 increases.

Thus, in the reinforcing structure 10 relating to the first embodiment, the portion 40 of gradually changing thickness of each of the ribs 30 is structured by the first curved portions 42, whose curvature is small, and the second curved portions 44, whose curvature is greater than that of the first curved portions 42, and the portion 50 of gradually changing height of each of the ribs 30 is structured by the third curved portion 52, whose curvature is small, and the fourth curved portion 54, whose curvature is greater than that of the third curved portion 52.

Due thereto, excess thickness of the rib 30 is reduced by the second curved portions 44 and the fourth curved portion 54, as compared with a case in which the portion 40 of gradually changing thickness is structured by curved portions that have a uniform curvature (only the first curved portions 42) and the portion 50 of gradually changing height is structured by a curved portion that has a uniform curvature (only the third curved portion 52). Accordingly, the amount of material that is needed to mold the rear cross member 20 is reduced, and the weight of the rear cross member main body 24 is reduced.

Further, when load is inputted to the rear cross member main body 24, the concentration of stress with respect to the portion 40 of gradually changing thickness is mitigated by the first curved portions 42, and the concentration of stress with respect to the portion 50 of gradually changing height is mitigated by the third curved portion 52. Accordingly, warping that arises at the portion 40 of gradually changing thickness and the portion 50 of gradually changing height is reduced, and the fatigue strength at the portion 40 of gradually changing thickness and the portion 50 of gradually changing height is improved.

Namely, in accordance with the reinforcing structure 10 relating to the first embodiment, while the weight of the ribs 30 is reduced, the reinforcing effect of the ribs 30 on the rear cross member main body 24 can be improved efficiently, and the strength and rigidity of the rear cross member main body 24 can be improved effectively. In particular, the rigidity of the bosses 28, with respect to load in the vehicle body vertical direction that is inputted to the bosses 28, can be improved more effectively by the ribs 30 that connect the bosses 28 with one another or that connect the bosses 28 and the peripheral walls 26.

Further, as described above, because the strength and the rigidity of the rear cross member main body 24 can be improved effectively, warping that arises at the rear cross member 20, i.e., the suspension member 12, also can be reduced (suppressed). Accordingly, at the vehicle, the handling stability can be improved.

The supporting rigidity of the suspension member 12 with respect to the lower arms, that are mounted only to the rear cross member 20, also can be improved. Therefore, noise that is due to vibration inputted from the front wheels (not illustrated) or the power unit can be suppressed (the noise and vibration performance can be improved).

Further, the length L1 of the portion 40 of gradually changing thickness and the length L2 of the portion 50 of gradually changing height in the extending direction of the rib 30 are made to be substantially equal. Therefore, as compared with a structure in which the length L1 of the portion 40 of gradually changing thickness and the length L2 of the portion 50 of gradually changing height in the extending direction of the rib 30 are not made to be substantially equal, the load resistance of the rear cross member main body 24 due to the ribs 30 can be improved regardless of the direction of input of the load that is inputted to the rear cross member main body 24.

The length L1 of the portion 40 of gradually changing thickness and the length L2 of the portion 50 of gradually changing height in the extending direction of the rib 30 are respectively made to be greater than or equal to the height H of the peripheral walls 26 (or the bosses 28). Therefore, the effect of reinforcing the peripheral walls 26 (or the bosses 28) can be improved as compared with a structure in which the length L1 of the portion 40 of gradually changing thickness and the length L2 of the portion 50 of gradually changing height in the extending direction of the rib 30 are respectively made to be less than the height H of the peripheral walls 26 (or the bosses 28).

Further, as shown in FIG. 6, the length Ln of the portion 40 of gradually changing thickness at the thin plate rib 36 is made to be longer than the length Lk of portion 40 of gradually changing thickness at the thick plate rib 38. Accordingly, the strength and the rigidity of the portion 40 of gradually changing thickness (including also the portion 50 of gradually changing height) at the thin plate rib 36 can be improved while the weight of the rib 30 is reduced (the amount of material needed for molding the rear cross member 20 is reduced and lightening of the weight of the rear cross member main body 24 is devised), as compared with a structure in which the length Ln of the portion 40 of gradually changing thickness at the thin plate rib 36 is made to be the same as the length Lk of portion 40 of gradually changing thickness at the thick plate rib 38 (the case of the portion 140 of gradually changing thickness relating to the comparative example), or is made to be shorter than that.

Further, because the rear cross member 20 (the rear cross member main body 24) is formed by die-casting a light metal material such as an aluminum alloy or the like, the bearing surfaces and the bosses 28 and the like for mounting other parts can be formed easily. Namely, although the rear cross member 20 has high rigidity, there is a large number of degrees of freedom in the shape thereof, and a reduction in the number of parts thereof (further lightening of the weight thereof) can be devised.

Because the sub side rail portions 22 of the rear cross member 20 are formed, in cross-section, substantially in the shapes of hats whose vehicle body lower sides are open, assembling (joining) of the sub side rail portions 22 to the side rail portions 18 of the front body mounts 16 is easy. Accordingly, the processes of assembling the suspension member 12 can be simplified.

Further, the side rail portions 18 of the front body mounts 16 and the sub side rail portions 22 of the rear cross member 20 are linearly joined by arc welding. Therefore, the both can be joined together securely, and foreign matter entering-in between the both can be suppressed or prevented. Accordingly, electrolytic corrosion arising between the both can be suppressed or prevented. Note that the same is true also for the linear joining by arc welding of the extending portions 17 of the front body mounts 16 and the front cross member 14.

Second Embodiment

The reinforcing structure 10 relating to a second embodiment is described next. Note that regions that are equivalent to those of the above-described first embodiment are denoted by the same reference numerals, and detailed description thereof (including description of operation common to both embodiments) is omitted as appropriate.

Figure 7:
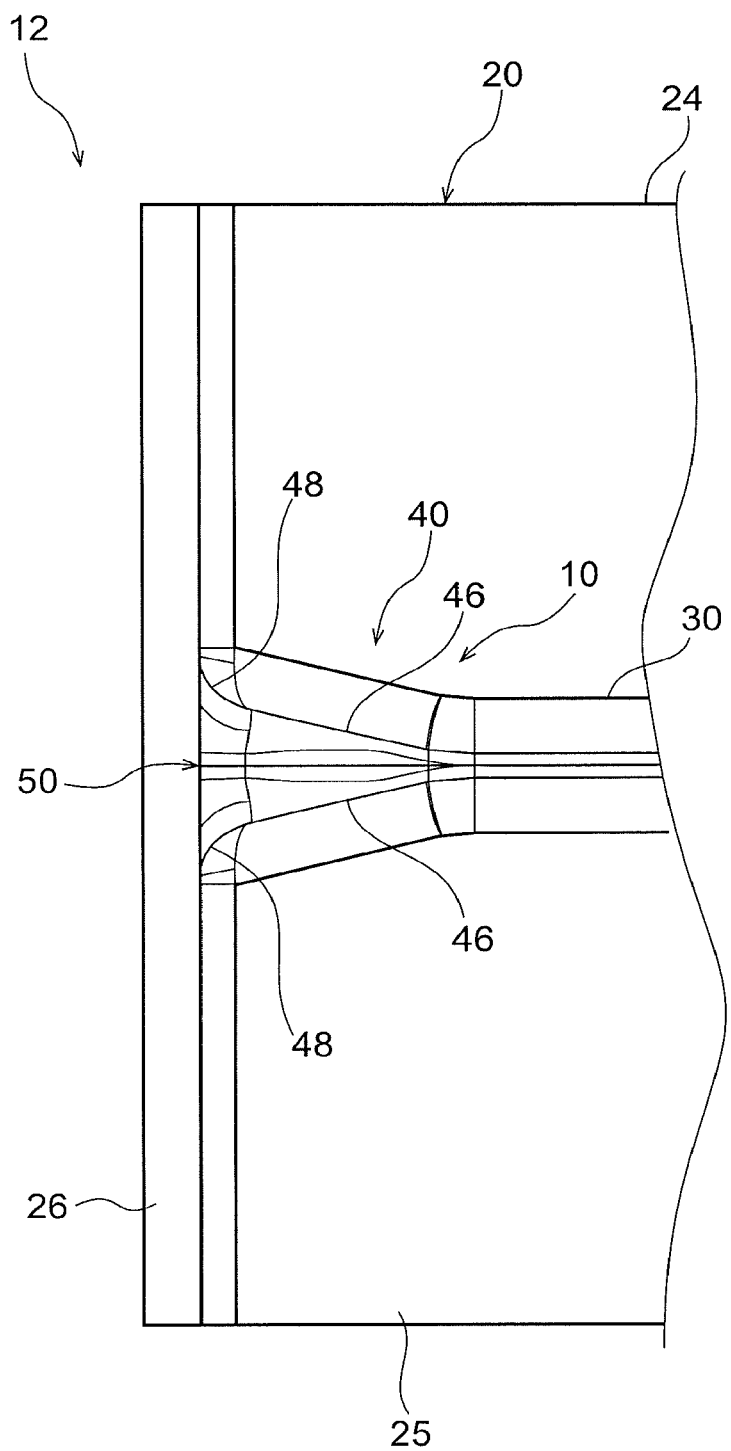
FIG. 7 is a plan view schematically showing, in an enlarged manner, a portion of the rib that is formed at the rear cross member of the suspension member that has a reinforcing structure relating to a second embodiment.

As shown in FIG. 7, the second embodiment differs from the above-described first embodiment with regard to the point that the portion 40 of gradually changing thickness is structured by first linear portions 46 that are at the extending direction central portion side of the rib 30, and thickness direction curved portions 48 that are formed in continuation with the first linear portions 46 further toward the peripheral wall 26 side than the first linear portions 46.

Figure 8:
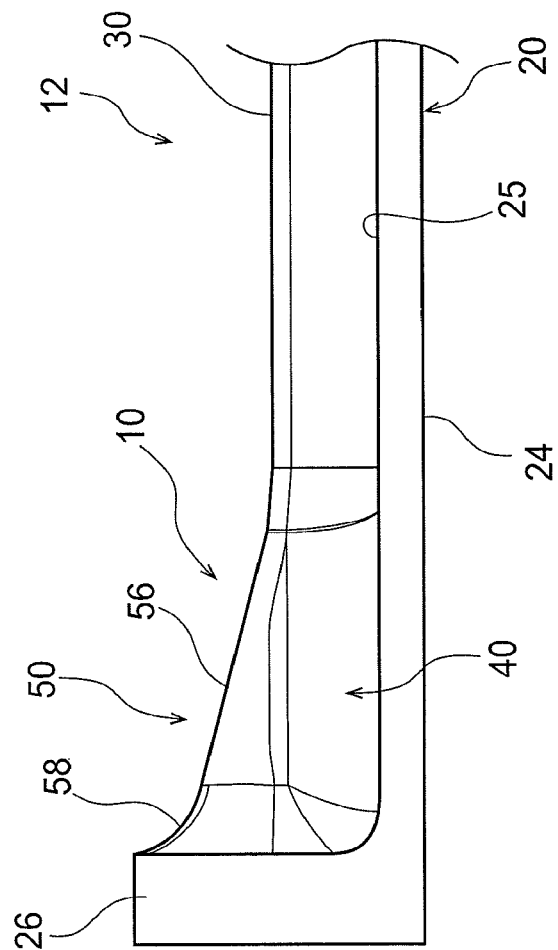
FIG. 8 is a side view schematically showing, in an enlarged manner, a portion of the rib that is formed at the rear cross member of the suspension member that has the reinforcing structure relating to the second embodiment.

Further, as shown in FIG. 8, the second embodiment differs from the above-described first embodiment with regard to the point that the portion 50 of gradually changing height is structured by a second linear portion 56 that is at the extending direction central portion side of the rib 30, and a height direction curved portion 58 that is formed in continuation with the second linear portion 56 further toward the peripheral wall 26 side than the second linear portion 56.

Namely, the second embodiment differs from the above-described first embodiment only with regard to the point that the first curved portions 42 and the third curved portion 52 of the above-described first embodiment are made to be the first linear portions 46 and the second linear portion 56 that are respectively straight shapes. Operation and effects that are similar to those of the above-described first embodiment are obtained also in the reinforcing structure 10 relating to the second embodiment that has such a structure.

Namely, the excess thickness of the rib 30 is reduced by the thickness direction curved portions 48 and the height direction curved portion 58, as compared with a case in which the portion 40 of gradually changing thickness is structured only by the first linear portions 46 and the portion 50 of gradually changing height is structured only by the second linear portion 56. Accordingly, the amount of material needed for molding the rear cross member 20 is reduced, and the weight of the rear cross member main body 24 is lightened.

Further, when load is inputted to the rear cross member main body 24, the concentration of stress with respect to the portion 40 of gradually changing thickness is mitigated by the first linear portions 46, and the concentration of stress with respect to the portion 50 of gradually changing height is mitigated by the second linear portion 56. Accordingly, warping that arises at the portion 40 of gradually changing thickness and the portion 50 of gradually changing height is reduced, and the fatigue strength at the portion 40 of gradually changing thickness and the portion 50 of gradually changing height is improved.

Namely, also in the case of the reinforcing structure 10 relating to the second embodiment, while the weight of the ribs 30 is reduced, the reinforcing effect of the ribs 30 on the rear cross member main body 24 can be improved efficiently, and the strength and rigidity of the rear cross member main body 24 can be improved effectively.

The reinforcing structures 10 of a vehicle frame member (the suspension member 12, and, in detail, the rear cross member main body 24 of the rear cross member 20) relating to the present embodiments have been described above on the basis of the drawings, but the reinforcing structures 10 relating to the present embodiments are not limited to the illustrated structures, and the designs thereof can be changed appropriately within a scope that does not depart from the gist of the present disclosure. For example, the light metal material is not limited to an aluminum alloy, and may be a magnesium alloy or the like.

Further, the material of the vehicle frame member relating to the present embodiments is not limited to a light metal material, and, for example, may be a resin material such polycarbonate (PC) or acrylonitrile butadiene styrene (ABS) or the like, or may be a fiber reinforced resin material (FRP) exemplified by carbon fiber reinforced resin materials (CFRPs). Note that, in cases of the aforementioned resin materials, the vehicle frame member is molded by injection molding or the like.

Further, the reinforcing structures 10 relating to the present embodiments are not limited to structures that are applied to a suspension member 12. For example, although not illustrated, the reinforcing structures 10 can be applied also to a suspension tower or an engine case or the like that has ribs. Further, the ribs 30 in the present embodiments are not limited to structures that are formed with respect to planar portions having both standing wall portions (the peripheral walls 26) and projecting portions (the bosses 28), and can be formed also with respect to planar portions having only standing wall portions (the peripheral walls 26), or planar portions having only projecting portions (the bosses 28).

Further, the extending portions 17 of the front body mounts 16 and the front cross member 14 are not limited to shapes that are rectangular in cross-section, and may be, for example, shapes that are circular in cross-section. Further, the welding that linearly joins the extending portions 17 of the front body mounts 16 and the front cross member 14, and the welding that linearly joins the side rail portions 18 of the front body mounts 16 and the sub side rail portions 22 of the rear cross member 20, are not limited to arc welding, and may be, for example, laser welding or the like.

What is claimed is:

1. A reinforcing structure of a vehicle frame member, comprising:
   a vehicle frame member that is molded from a light metal material or a resin material, and at which at least one of a plurality of standing wall portions and a plurality of projecting portions are formed at a planar portion;
   ribs that are formed at the planar portion, and that integrally connect the standing wall portions to one another or the projecting portions to one another or the standing wall portions and the projecting portions, and that reinforce the planar portion;
   portions of gradually changing thickness that are formed at connected portions of the ribs with the standing wall portions or the projecting portions, and at which a thickness of the rib is made to become thicker toward the standing wall portion or the projecting portion;
   portions of gradually changing height that are formed at the connected portions of the ribs with the standing wall portions or the projecting portions, and at which a height of the rib is made to become higher toward the standing wall portion or the projecting portion;
   first curved portions that are formed at the portions of gradually changing thickness;
   second curved portions that are formed in continuation with the first curved portions at the portions of gradually changing thickness, at further toward the standing wall portion sides or the projecting portion sides than the first curved portions, and whose curvature is greater than that of the first curved portions;
   third curved portions that are formed at the portions of gradually changing height; and
   fourth curved portions that are formed in continuation with the third curved portions at the portions of gradually changing height, at further toward the standing wall portion sides or the projecting portion sides than the third curved portions, and whose curvature is greater than that of the third curved portions.

2. A reinforcing structure of a vehicle frame member, comprising:
   a vehicle frame member that is molded from a light metal material or a resin material, and at which at least one of a plurality of standing wall portions and a plurality of projecting portions are formed at a planar portion;
   ribs that are formed at the planar portion, and that integrally connect the standing wall portions to one another or the projecting portions to one another or the standing wall portions and the projecting portions, and that reinforce the planar portion;
   portions of gradually changing thickness that are formed at connected portions of the ribs with the standing wall portions or the projecting portions, and at which a thickness of the rib is made to become thicker toward the standing wall portion or the projecting portion;
   portions of gradually changing height that are formed at the connected portions of the ribs with the standing wall portions or the projecting portions, and at which a height of the rib is made to become higher toward the standing wall portion or the projecting portion;
   first linear portions that are formed at the portions of gradually changing thickness;
   thickness direction curved portions that are formed in continuation with the first linear portions at the portions of gradually changing thickness, at further toward the standing wall portion sides or the projecting portion sides than the first linear portions;
   second linear portions that are formed at the portions of gradually changing height; and
   height direction curved portions that are formed in continuation with the second linear portions at the portions of gradually changing height, at further toward the standing wall portion sides or the projecting portion sides than the second linear portions.

3. The reinforcing structure of a vehicle frame member of claim 1, wherein a length of the portion of gradually changing thickness and a length of the portion of gradually changing height in an extending direction of the rib are made to be the same.

4. The reinforcing structure of a vehicle frame member of claim 1, wherein a length of the portion of gradually changing thickness and a length of the portion of gradually changing height in an extending direction of the rib are respectively made to be greater than or equal to a height of the standing wall portions or the projecting portions.

5. The reinforcing structure of a vehicle frame member of claim 1, wherein the ribs have thin plate ribs and thick plate ribs whose thicknesses at a portion other than the portion of gradually changing thickness differ from one another, and a length of the portion of gradually changing thickness at the thin plate rib is made to be longer than a length of the portion of gradually changing thickness at the thick plate rib.

6. The reinforcing structure of a vehicle frame member of claim 1, wherein
   the vehicle frame member is a suspension member, and
   the standing wall portions are peripheral walls of the suspension member, and the projecting portions are bosses for fastening of the suspension member.

7. The reinforcing structure of a vehicle frame member of claim 2, wherein a length of the portion of gradually changing thickness and a length of the portion of gradually changing height in an extending direction of the rib are made to be the same.

8. The reinforcing structure of a vehicle frame member of claim 2, wherein a length of the portion of gradually changing thickness and a length of the portion of gradually changing height in an extending direction of the rib are respectively made to be greater than or equal to a height of the standing wall portions or the projecting portions.

9. The reinforcing structure of a vehicle frame member of claim 2, wherein the ribs have thin plate ribs and thick plate ribs whose thicknesses at a portion other than the portion of gradually changing thickness differ from one another, and a length of the portion of gradually changing thickness at the thin plate rib is made to be longer than a length of the portion of gradually changing thickness at the thick plate rib.

10. The reinforcing structure of a vehicle frame member of claim 2, wherein
    the vehicle frame member is a suspension member, and
    the standing wall portions are peripheral walls of the suspension member, and the projecting portions are bosses for fastening of the suspension member.

* * * * *